United States Patent [19]

Hess et al.

[11] Patent Number: 5,446,956
[45] Date of Patent: Sep. 5, 1995

[54] OVERHEAD DOOR REPLACEMENT SYSTEM

[75] Inventors: Terry L. Hess, Mt. Gilead; Michael S. Davis, Gahanna; Lewis J. Slone, Columbus, all of Ohio

[73] Assignee: Brooks Beverage Management, Inc., Columbus, Ohio

[21] Appl. No.: 202,612

[22] Filed: Apr. 1, 1994

[51] Int. Cl.⁶ .............................................. B23P 6/00
[52] U.S. Cl. ........................ 29/402.09; 29/401.1; 29/402.11; 29/453
[58] Field of Search .......... 29/402.06, 402.09, 402.11, 29/402.12, 402.13, 402.14, 402.15, 402.16, 402.17, 401.1, 453, 402.08; 16/87.4, 95 R, 96 R, 99, 102, DIG. 1

[56] References Cited

U.S. PATENT DOCUMENTS

| | | | |
|---|---|---|---|
| 509,650 | 11/1893 | Brodie | 16/96 R X |
| 1,485,200 | 2/1924 | Roberts et al. | 16/96 R |
| 2,340,450 | 2/1944 | Bouschor | 29/402.06 |
| 3,342,246 | 9/1967 | Reiss | 16/96 R |
| 3,885,291 | 5/1975 | Di Chiara | 29/402.11 |
| 4,292,723 | 10/1981 | Rauscher | 29/402.06 X |
| 4,800,619 | 1/1989 | Hudak | 16/95 R |

FOREIGN PATENT DOCUMENTS

| | | | |
|---|---|---|---|
| 524940 | 4/1955 | Italy | 16/96 R |
| 1302868 | 1/1973 | United Kingdom | 16/96 R |

*Primary Examiner*—Joseph M. Gorski
*Attorney, Agent, or Firm*—John L. Gray; Patricia L. Prior

[57] ABSTRACT

A method of reconditioning the tracks for rollers of an overhead door by using a machining device to machine down the interior of the tracks and cutting a groove on the interior sides of the tracks whereby a metal insert can be snapped into the grooves on the interior sides of the tracks.

2 Claims, 3 Drawing Sheets

OVERHEAD DOOR REPLACEMENT SYSTEM

BACKGROUND OF THE INVENTION

This invention relates to a method of reconditioning the interior tracks for rollers of an overhead door. Beverage trucks usually have vertically opening side doors for easy access to the product being transported for delivery. These doors ride on wheels in oppositely disposed tracks. These tracks historically are made of aluminum and the normal vibration of the truck causes the tracks to become pitted and consequently need refurbishing.

The indentations that occur on the interior of the tracks from use of the doors and from vibration of the truck have been previously corrected by adding metal to the tracks by welding metal to the interior tracks and then grinding the tracks down. Also, in some cases a nylon insert has been installed, but this insert does not wear very well.

The concept of reconditioning the tracks for rollers of an overhead door does not appear to have been addressed in any prior art, but a wear resistant track is disclosed in U.S. Pat. No. 4,800,619, Hudak.

The Hudak patent is entitled "*Wear Insert for a Door Channel*", issued Jan. 31, 1989. This patent discloses a wear resistant track composed of a nonmetal insert, a metal channel, and a locking means for releasably interlocking the two together. However, the disclosure of Hudak is not a replacement system but is an original structure for a door and would not be useful in solving the problem which this invention solves.

The prior art is not concerned with a method for reconditioning the interior tracks of an overhead door.

SUMMARY OF THE INVENTION

A method of reconditioning the interior tracks for rollers of an overhead door is set forth. The worn track is machined down by a tool which is so designed that it will track down the interior of the worn track and cut a tapered groove along one side of the interior of the track and slightly deflect the side of the track outwardly towards the top. In addition, the tool can be turned around 180° to cut a tapered groove on the opposite side also.

This tool is hand-operated and has wheels at each end that will fit on the track and enable it to be rolled along the interior of the track. These wheels are the two outboard members. This tool also has two inboard rollers which are bearings which bear against the side of the track in order to slightly deflect it outwardly. The bearings can be replaced with other bearings, depending upon the size of the track. This tool also has a rotating cutting device that is driven by an electrical motor, which is basically what you would find in a conventional router, modified to produce the angular cut that is desired. The unique design of this tool enables it to machine down the interior of the tracks to allow for the insertion of a replacement liner.

This replacement liner, which is made out of stainless steel is turned outwardly at the upper edges so that it will snap into the grooves previously cut into the interior sides of the tracks and thus be held in place.

DETAILED DESCRIPTION OF THE INVENTION

Figure 1:
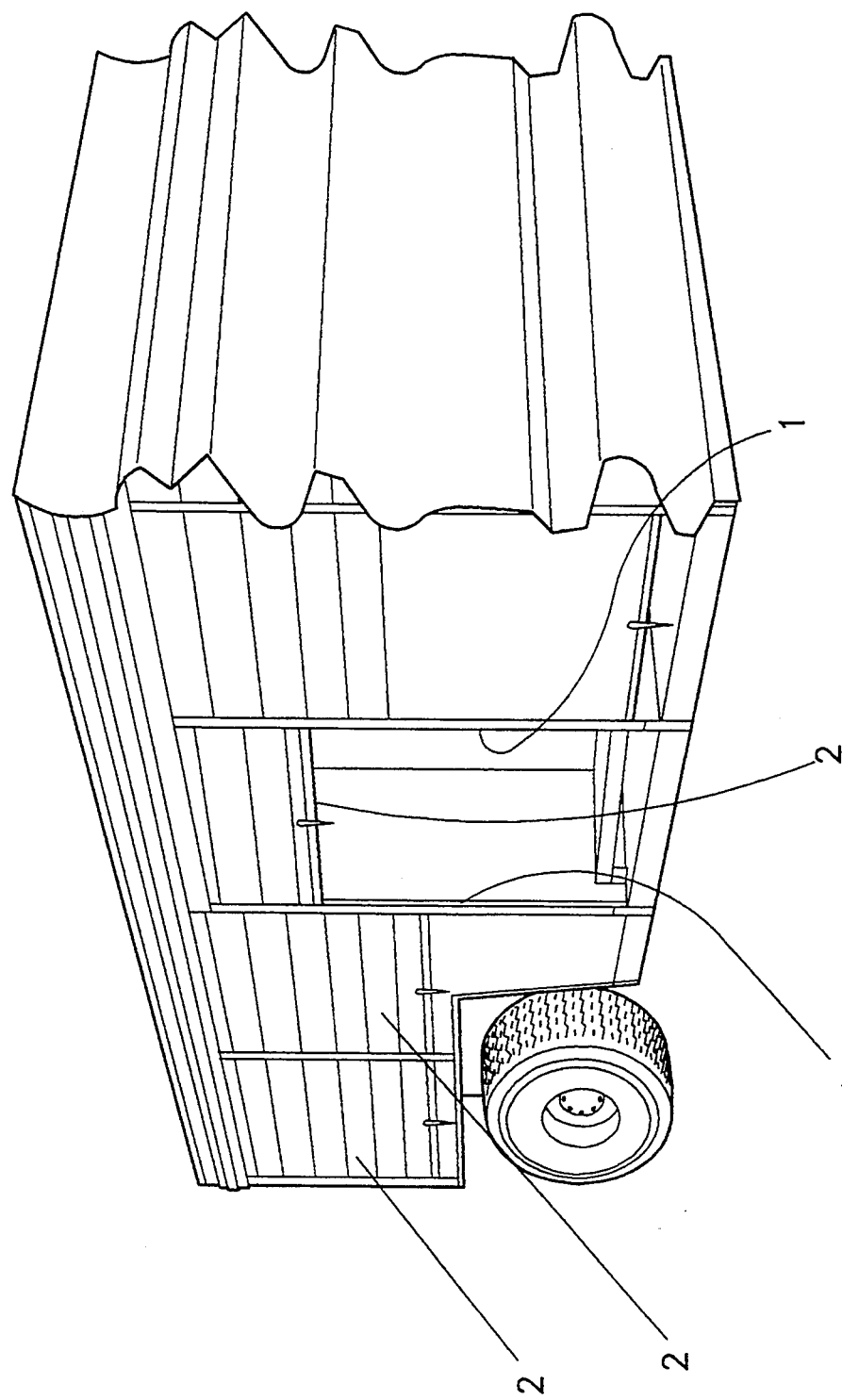
FIG. 1 shows a conventional beverage truck having side doors mounted on rollers for overhead movement in vertical channels.

Referring to FIG. 1, there is shown a beverage truck which has oppositely disposed tracks 1—1 on which the storage doors 22 can be opened vertically so that the product can be readily accessed by the driver for delivery to stores. These vertically opening overhead doors 2—2 ride on wheels (not shown) in the tracks.

Figure 2:
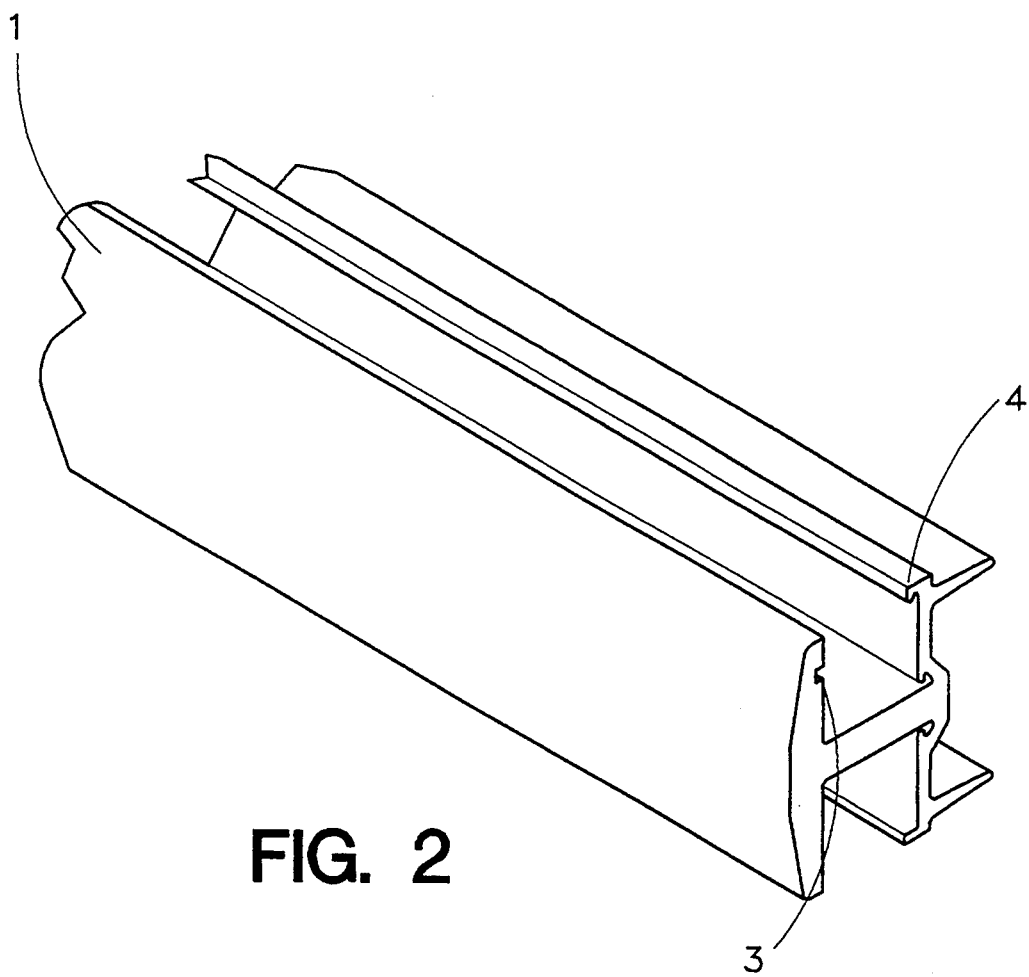
FIG. 2 is an elevated perspective view of the track for rollers of an overhead door.

Referring to FIG. 2, there is shown a section of the track 1 used in conjunction with an overhead door 2. This section of the track 1 contains a tapered groove 3 that has been cut along the interior of the track 1. In addition, this same section of track 1 also has an overlap 4 that is present in some overhead door tracks 1.

Figure 3:
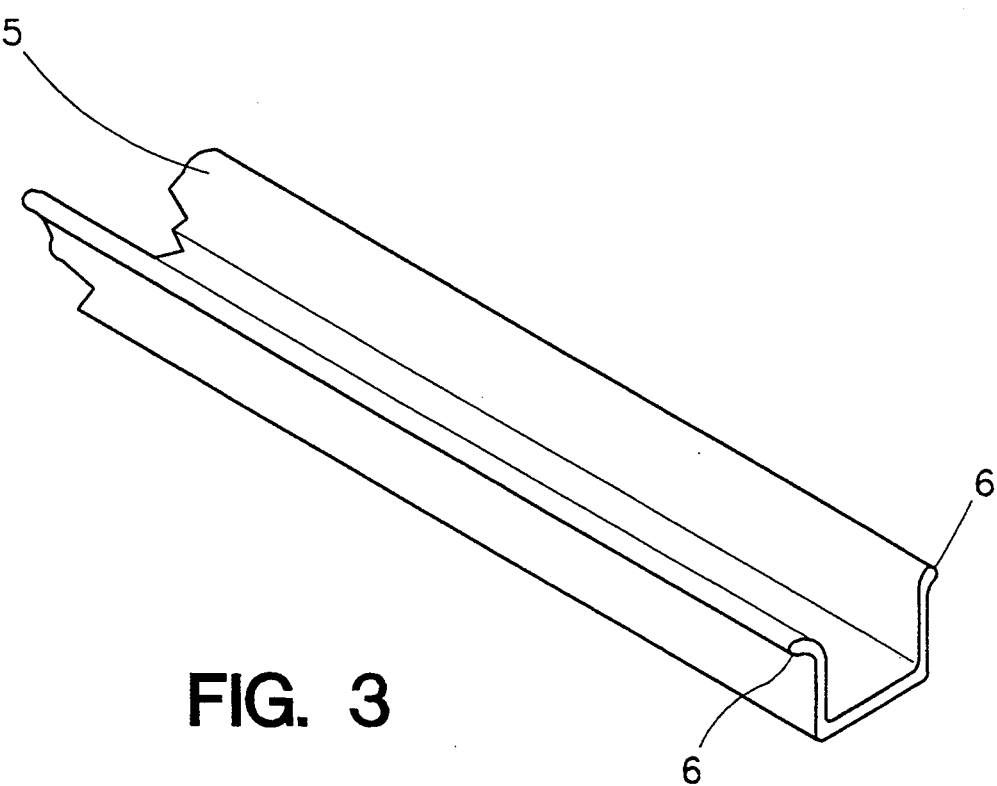
FIG. 3 is an elevated perspective view of the stainless steel insert.

Referring to FIG. 3, there is shown the stainless steel replacement insert 5. This replacement insert 5 is turned outwardly at the upper edges 6—6 so that it will snap into the groove 3 and the overlap 4, and be held in place.

Figure 4:
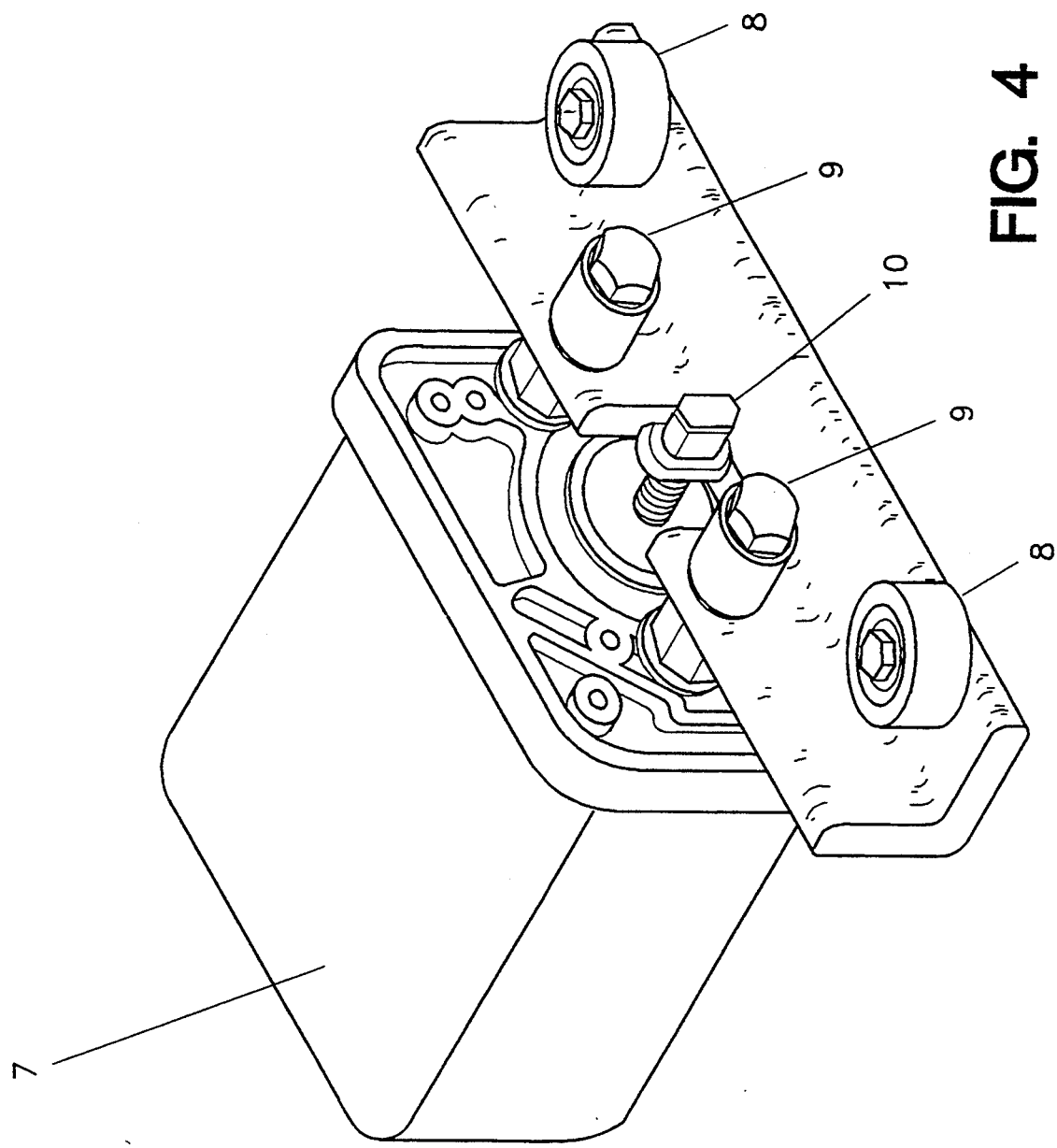
FIG. 4 is an elevated perspective view of the cutting tool.

Referring to FIG. 4, there is shown the cutting tool 7 for cutting grooves on the interior sides of the tracks. This tool 7 is hand-operated and has wheels 8—8 at each end that will fit on the track 1 and enable it to be rolled along the interior of the track 1. This tool 7 also has two inboard rollers which are bearings 9—9, which bear against the side of the track 1. The bearings 9—9 can be replaced with other bearings, depending upon the size of the track 1. This tool 7 also has a rotating cutting device 10 that is driven by an electrical motor contained in the tool 7, and set at an appropriate angle to produce the cut that is desired.

The tool 7 is operated by being placed in the upright position in order for the wheels 8—8 to roll along the interior of the track 1. While the wheels 8—8 are rolling down the interior of the track 1, the bearings 9—9 are pressing against the side of the track 1, causing the side of the track 1 to be slightly deflected outwardly. Furthermore, the rotating cutting device 10 of the tool 7 will cut a tapered groove 3 along one side of the interior track 1. However, an additional tapered groove 3 can be cut along the other side of the interior of the track 1 by rotating the tool 7 180°. Once the interior of the track 1 is slightly deflected outwardly and the groove or grooves 3 are cut along the sides, then the stainless steel replacement insert 5 can be snapped into the grooves 3 and held in place.

While the above description constitutes the preferred embodiment, it will be appreciated that the present invention is susceptible to modification and change without departing from the fair meaning or proper scope of the accompanying claims.

What is claimed is:

1. A method of reconditioning a track for rollers in an overhead door, said track having a bottom, two essentially vertical sides, and an open top, comprising the steps of:

placing a machining device in said track, said machining device having a cutting tool, a plurality of wheels, and a plurality of inboard bearings;

rolling said wheels of said machining device along said track while pressing said inboard bearings against a first side of said track;

causing said cutting tool to cut a groove in said first side of said track and said inboard bearings to deflect said first side of said track slightly outwardly from an essentially vertical position;

placing a metal insert within said track, said insert being adapted to extend longitudinally in said track, said insert having a generally u-shaped cross-section, but provided with a flattened base portion and further provided with sides having an upper edge extending outwardly therefrom; and pushing said metal insert into said track until a first upper edge of said insert snaps into said groove in said first side of said track.

2. The method of claim 1 further comprising causing said cutting tool to cut a groove in a second side of said track and said inboard bearings to deflect said second side of said track slightly outwardly from an essentially vertical position, and pushing said insert into said track until a second upper edge of said insert snaps into said groove in said second side of said track.

* * * * *